United States Patent [19]
Wong

[11] Patent Number: 5,850,347
[45] Date of Patent: Dec. 15, 1998

[54] CALCULATING 2A+ SIGN(A) IN A SINGLE INSTRUCTION CYCLE

[75] Inventor: Roney S. Wong, Sunnyvale, Calif.

[73] Assignee: Samsung Semiconductor, Inc., San Jose, Calif.

[21] Appl. No.: 719,187

[22] Filed: Sep. 24, 1996

[51] Int. Cl.$^6$ ............................................. G06F 7/50
[52] U.S. Cl. ............................... 364/768; 364/784.01
[58] Field of Search ................................ 364/768, 770, 364/746.2, 715.012, 715.011, 715.02, 784.01; 395/562

[56] References Cited

U.S. PATENT DOCUMENTS

| | | | |
|---|---|---|---|
| 4,218,751 | 8/1980 | McManigal | 364/715.012 |
| 4,709,226 | 11/1987 | Christopher | 341/93 |
| 4,953,115 | 8/1990 | Kanoh | 364/715.012 |
| 5,267,187 | 11/1993 | Hsieh et al. | 364/784.01 |
| 5,373,459 | 12/1994 | Taniguchi | 364/715.012 |
| 5,574,671 | 11/1996 | Young et al. | 364/715.03 |

OTHER PUBLICATIONS

U.S. Application Serial No. 08/658,454, Filed Jun. 5, 1996, entitled "Zero Detect for Binary Sum" by R. Wong.
U.S. Application Serial No. 08/695,142, Filed Aug. 8,1996, entitled "Zero Detect for Binary Difference " by R. Wong.

*Primary Examiner*—Reba I. Elmore
*Assistant Examiner*—Robert J. Dolan
*Attorney, Agent, or Firm*—Skjerven, Morrill, MacPherson, Franklin & Friel LLP

[57] ABSTRACT

The expression 2A+sign(A), where A is a signed binary integer represented in 2's complement form, sign(A) is equal to one when A is greater than zero, sign(A) is equal to zero when A is zero, and sign(A) is equal to negative one when A is less than zero, is calculated by bit-complementing A, bit-complementing (A+A+2) when A is less than zero, bit-complementing ($\bar{A}+\bar{A}+1$) when A is equal to zero, and bit-complementing all bits except a least significant bit of ($\bar{A}+\bar{A}+1$) when A is greater than zero. Zero detect for A is provided by determining whether a first carry-out bit from ($\bar{A}+\bar{A}+1$) and a second carry-out bit from ($\bar{A}+\bar{A}+2$) have different logical values. In this manner, 2A+sign(A) can be calculated by a general purpose computer in a single instruction cycle.

11 Claims, 5 Drawing Sheets

_5,850,347_

CALCULATING 2A+ SIGN(A) IN A SINGLE INSTRUCTION CYCLE

BACKGROUND OF THE INVENTION

1. Field of the Invention

The present invention relates to computer arithmetic, and more particularly to calculating the expression 2A+sign(A) for signed binary integers.

2. Description of Related Art

The Moving Picture Experts Group (MPEG) standard has emerged as the dominant standard for compressed digital video. The MPEG-1 standard specifies a compressed video bit-stream rate of approximately 1.5 megabits per second, and a compressed stereo audio bit-stream rate of approximately 250 kilobits per second. The second standard, MPEG-2, will specify compression rates for higher-bandwidth distribution media, and is in the process of being formalized. To meet the MPEG standard, video and audio compression and decompression products must rapidly process the various algorithms used to implement the MPEG standard.

In MPEG video signal processing, the basic video information processing unit is typically a macro-block, which has a 16×16 pixel matrix comprising four 8×8 luminance blocks, and two 8×8 chrominance blocks. Each pixel in a luminance block or chrominance block has an output corresponding to an unsigned integer number, and each macro-block is part of a much larger luminance or chrominance frame, as the case may be.

MPEG video signal processing includes a computation requirement for calculating 2A+sign(A) for each pixel in a block, where A is a signed binary integer, sign(A) is equal to one when A is greater than zero, sign(A) is equal to zero when A is zero, and sign(A) is equal to negative one when A is less than zero.

FIG. 1 is a flowchart of algorithm 100, which is known, for calculating 2A'sign(A). At step 102, signed binary operand A is obtained. Decision step 104 tests whether A is zero. If A is zero, the algorithm branches to end step 116 since A provides 2A+sign(A). If A is nonzero, the algorithm branches to decision step 106 which tests whether A is negative. If A is negative, at step 108 A is added to itself to obtain 2A, at step 110 2A is decremented to obtain 2A−1, and the algorithm terminates at end step 116 since 2A−1 provides 2A+sign(A). Returning to decision step 106, if A is nonnegative (and therefore greater than zero since A is nonzero) then at step 112 A is added to itself to obtain 2A, at step 114 2A is incremented to obtain 2A+1, and the algorithm terminates at end step 116 since 2A+1 provides 2A+sign(A). Conventional variations to algorithm 100 are apparent. For instance, 2A can be calculated before determining whether 2A (and thus A) is less than, greater than or equal to zero. Although algorithm 100 and related variations are simple to implement, they normally require several instruction cycles.

Moreover, providing zero detect at decision step 104 may require a large amount of chip area or several instruction cycles using conventional approaches. For instance, zero detect of an n-bit operand can be provided by an n-bit OR gate coupled to an inverter. The OR gate outputs a zero, which the inverter converts to a one, only when the operand consists of zero's. Drawbacks to this approach include the increased fan-in of the OR gate, which increases chip area, and the delay associated with ORing each bit of the operand. Another known technique for zero detect of a binary operand includes serially right-shifting the operand, and inspecting the shifted-out bits one at a time. As soon as a shifted-out bit of one is detected then the operand must be nonzero, whereas if all shifted-out bits are zero's then the operand must be zero. A drawback to this approach is that the right-shifting operation can be relatively time consuming and particularly difficult to implement in a single instruction cycle.

Accordingly, a need exists for calculating 2A+sign(A) in a rapid and efficient manner.

SUMMARY OF THE INVENTION

An object of the invention is to provide rapid and efficient calculation of 2A+sign(A). In accordance with a preferred aspect of the invention, 2A+sign(A) is calculated by a general purpose computer in a single instruction cycle.

The present invention includes a method of operating a circuit to calculate 2A+sign(A). One embodiment of the method includes bit-complementing A to obtain $\overline{A}$, bit-complementing $(\overline{A}+\overline{A}+2)$ to obtain 2A+sign(A) when A is less than zero, bit-complementing $(\overline{A}+\overline{A}+1)$ to obtain 2A+sign(A) when A is equal to zero, and bit-complementing all bits except a least significant bit of $(\overline{A}+\overline{A}+1)$ to obtain 2A+sign(A) when A is greater than zero. Preferably, the method includes setting a constant C to two and selecting the bit-complement of the least significant bit of $(\overline{A}+\overline{A}+2)$ when A is less than zero, setting the constant C to one and selecting the bit-complement of the least significant bit of $(\overline{A}+\overline{A}+1)$ when A is zero, and setting the constant C to one and selecting the least significant bit of $(\overline{A}+\overline{A}+1)$ when A is greater than zero. Setting the constant C is in response to a sign bit of A, indicative of whether A is positive or negative, and the selecting is in response to the sign bit of A and a zero detect flag, indicative of whether A is zero or nonzero. Furthermore, zero detect of A can be provided by determining whether a first carry-out bit from $(\overline{A}+\overline{A}+1)$ and a second carry-out bit from $(\overline{A}+\overline{A}+2)$ have different logical values.

The present invention also includes an apparatus for calculating 2A+sign(A). In one embodiment, the apparatus includes first and second inverter circuits, a data selector circuit, an adder circuit, and a multiplexer in combination. The first inverter circuit provides the bit-complement of A to first and second operand inputs of the adder circuit. The data selector circuit sets a constant C to two when A is less than zero and to one when A is greater than or equal to zero, and provides the constant C to a third operand input of the adder circuit. The adder circuit calculates $(\overline{A}+\overline{A}+1)$ at a sum output when A is less than zero, and $(\overline{A}+\overline{A}+1)$ at the sum output when A is greater than or equal to zero. The second inverter circuit provides the bit-complement of the sum output. Finally, the multiplexer selects the least significant bit of the sum output when A is greater than zero, and otherwise selects the least significant bit of the second inverter circuit. Preferably, the adder generates a first carry-out bit from the sum output and a second carry-out bit from a sum-plus-one output, and a zero detect circuit determines whether A is zero by determining whether the first and second carry-out bits have different logical values.

These and other objects, features and advantages of the invention will be further described and more readily apparent from a review of the detailed description of the preferred embodiments which follow.

BRIEF DESCRIPTION OF THE DRAWINGS

In the drawings, which are not necessarily drawn to scale, in which like reference characters indicate like parts.

DETAILED DESCRIPTION OF THE PREFERRED EMBODIMENTS

Figure 1:
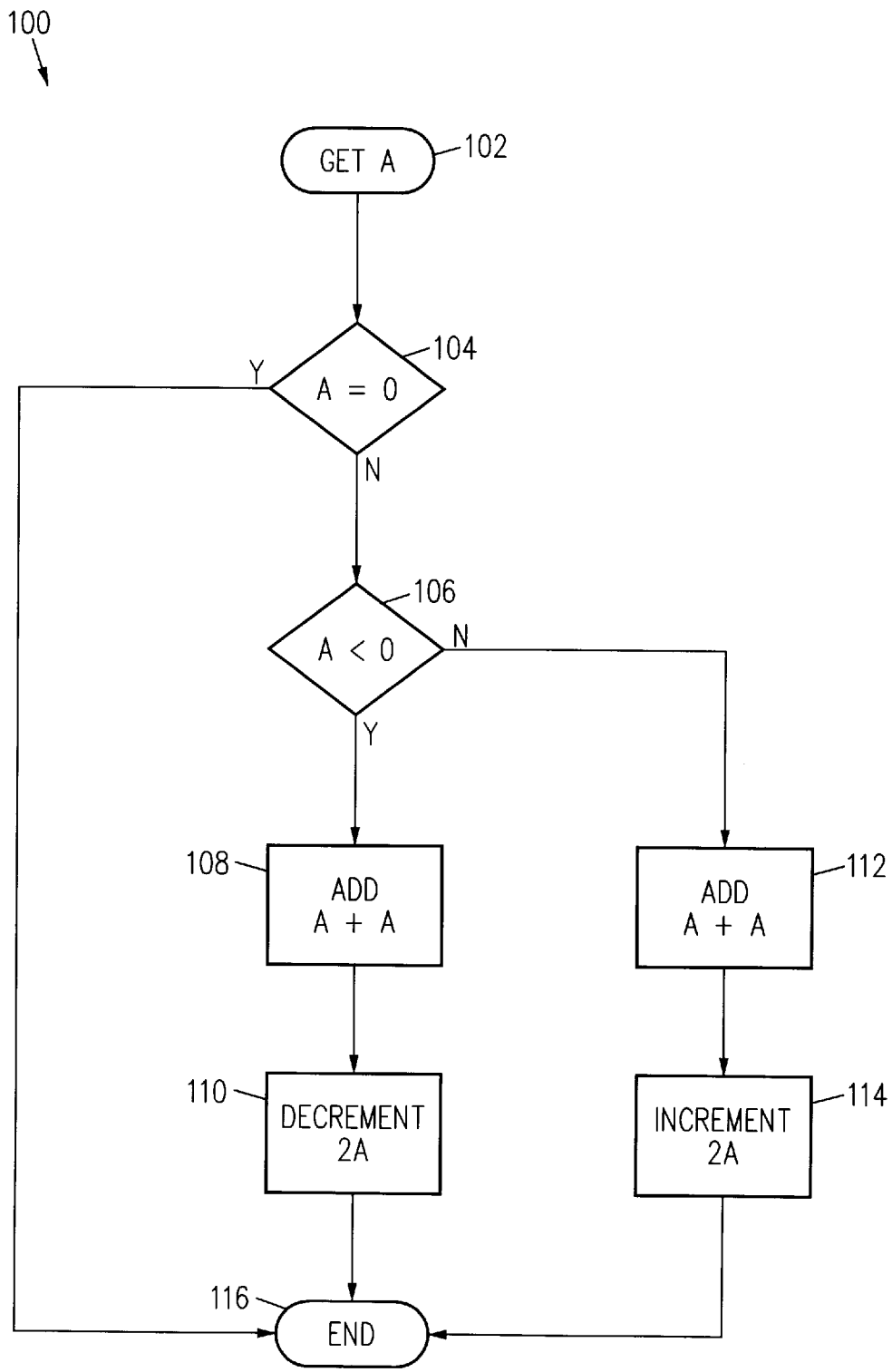
FIG. 1 is a flow chart of a known algorithm for calculating 2A+sign(A).

The present invention calculates 2A+sign(A) in a single instruction cycle by bit-complementing A to obtain $\overline{A}$, bit-complementing $\overline{(\overline{A}+\overline{A}+2)}$ to obtain 2A+sign(A) when A is less than zero, bit-complementing $\overline{(\overline{A}+\overline{A}+1)}$ to obtain 2A+sign(A) when A is equal to zero, and bit-complementing all bits except a least significant bit of $\overline{(\overline{A}+\overline{A}+1)}$ to obtain 2A+sign(A) when A is greater than zero.

As used herein, A is a signed binary integer represented in 2's complement form. As mentioned above, sign(A) is equal to one when A is greater than zero, sign(A) is equal to zero when A is zero, and sign(A) is equal to negative one when A is less than zero. Determining whether A is positive (including zero) or negative is accomplished by inspection of its most significant bit ("MSB"). For a positive A the MSB=0, whereas for a negative A the MSB=1. Bit-complementing is equivalent to a 1's complement operation. For instance, $\overline{A}$ designates the bit-complement of A. Finally, incrementing refers to increasing by one.

The present invention is perhaps best understood by considering some of the underlying mathematics. In 2's complement representation, the negative of an integer number is provided by taking the 1's complement of the number and then incrementing, that is, $$-A = \overline{A}+1 \qquad (1)$$

$$\overline{A} = -A-1 \qquad (2)$$

Consider the following algebraic manipulations for 2A+sign(A) when A is less than zero:

$$2A+sign(A)=2A+(-1) \qquad (3)$$

$$2A+sign(A)=2A-1 \qquad (4)$$

$$2A+sign(A)=-(-2A)-1 \qquad (5)$$

$$2A+sign(A)=\overline{-2A} \qquad (6)$$

$$2A+sign(A)=\overline{-2A-2+2} \qquad (7)$$

$$2A+sign(A)=\overline{(-A-1)+(-A-1)+2} \qquad (8)$$

$$2A+sign(A)=\overline{\overline{A}+\overline{A}+2+ee} \qquad (9)$$

Consider the following algebraic manipulations for 2A+sign(A) when A is equal to zero:

$$2A+sign(A)=2A+(0) \qquad (10)$$

$$2A+sign(A)=2A+1-1 \qquad (11)$$

$$2A+sign(A)=-(-2A-1)-1 \qquad (12)$$

$$2A+sign(A)=\overline{-2A-1} \qquad (13)$$

$$2A+sign(A)=\overline{-2A-2+1} \qquad (14)$$

$$2A+sign(A)=\overline{(-A-1)+(-A-1)+1} \qquad (15)$$

$$2A+sign(A)=\overline{\overline{A}+\overline{A}+1+ee} \qquad (16)$$

Consider the following algebraic manipulations for 2A+sign(A) when A is greater than zero:

$$2A+sign(A)=2A+(1) \qquad (17)$$

$$2A+sign(A)=2A+1-1+1 \qquad (18)$$

$$2A+sign(A)=(-(-2A-1)-1)+1 \qquad (19)$$

$$2A+sign(A)=\overline{-2A-1}+1 \qquad (20)$$

$$2A+sign(A)=\overline{-2A-2+1}+1 \qquad (21)$$

$$2A+sign(A)=\overline{(-A-1)+(-A-1)+1}+1 \qquad (22)$$

$$2A+sign(A)=\overline{\overline{A}+\overline{A}1+ee}+1 \qquad (23)$$

In accordance with expression (9), when A is less than zero, 2A+sign(A) is provided by bit-complementing $(\overline{A}+\overline{A}+2)$. In accordance with expression (16), when A is equal to zero, 2A+sign(A) is provided by bit-complementing $(\overline{A}+\overline{A}+1)$. In accordance with expression (23), when A is greater than zero, 2A+sign(A) is provided by bit-complementing $(\overline{A}+\overline{A}+1)$ and then incrementing the result.

Referring still to expression (23), it is noted that the least significant bit (LSB) of $\overline{A}+\overline{A}$ must always be a zero (since 0+0=0 and 1+1=10), therefore the LSB of $\overline{A}+\overline{A}+1$ must always be a one, the LSB of $\overline{A}+\overline{A}+1+ee$ must always be a zero, and the LSB of $\overline{\overline{A}+\overline{A}+1+ee}$ +1 must always be a one. Therefore, $\overline{\overline{A}+\overline{A}+1+ee}$ +1 can be obtained in several ways, including (1) incrementing $\overline{\overline{A}+\overline{A}+1+ee}$ ; (2) calculating $\overline{A}+\overline{A}+1+ee$ and setting the LSB to one; (3) setting the LSB of $\overline{A}+\overline{A}+1$ to zero and then bit-complementing the intermediate result; and (4) selecting the LSB of $\overline{\overline{A}+\overline{A}+1+ee}$ when A is equal to zero and selecting the LSB of $\overline{\overline{A}+\overline{A}+1}$ when A is greater than zero. In all cases, $\overline{\overline{A}+\overline{A}+1+ee}$ +1 is equivalent to bit-complementing all bits except the LSB of $\overline{A}+\overline{A}+1$.

Figure 2:
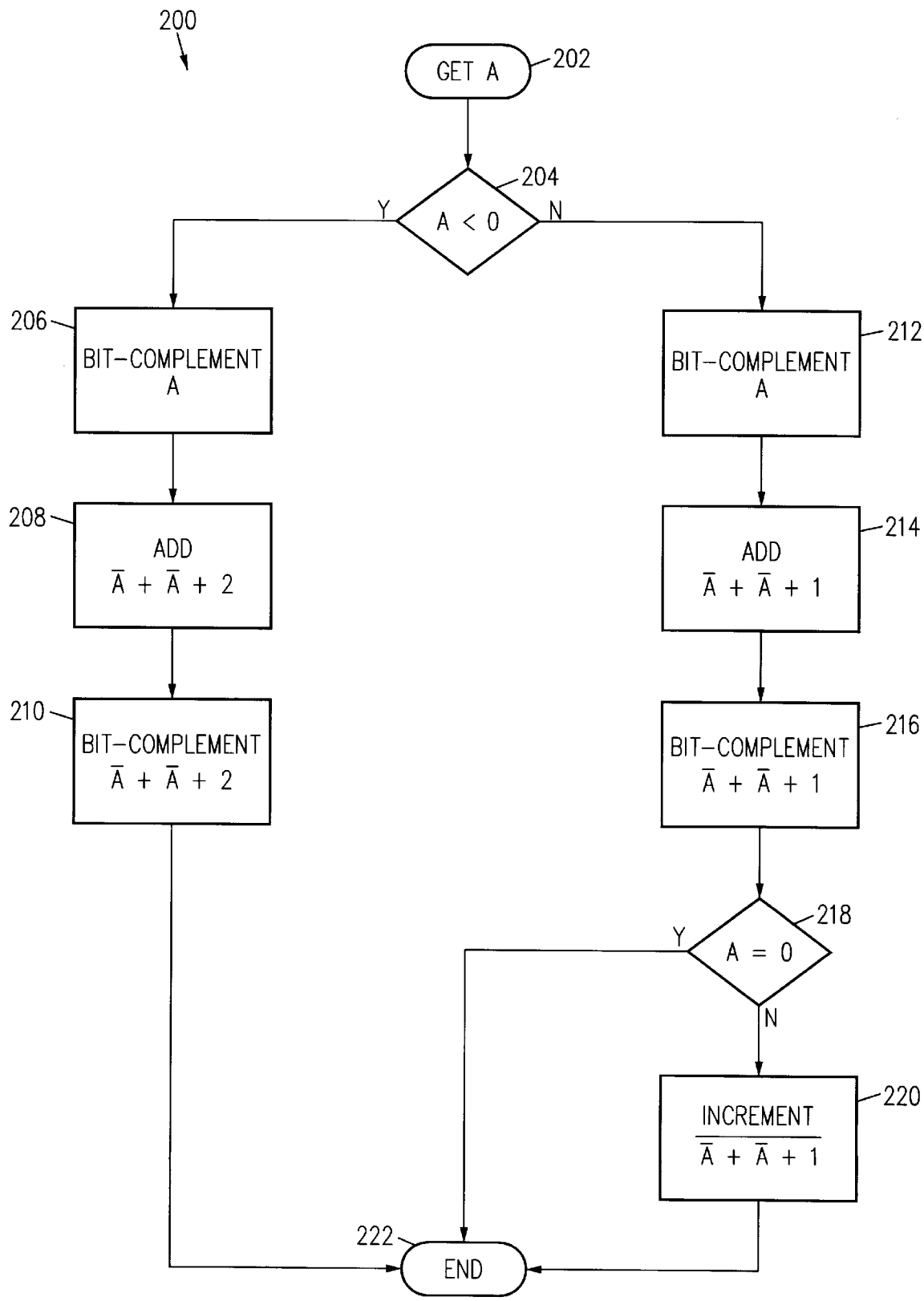
FIG. 2 is a flow chart of an algorithm for calculating 2A+sign(A) in accordance with an embodiment of the present invention.

FIG. 2 is a flow chart of algorithm 200 for calculating 2A+sign(A) in accordance with an embodiment of the invention. At step 202, signed binary operand A is obtained. Decision step 204 tests whether A is negative. If A is negative, at step 206 A is bit-complemented, at step 208 the sum $\overline{A}+\overline{A}+2$ is calculated, at step 210 the sum $\overline{A}+\overline{A}+2$ is bit-complemented to provide the result, and the algorithm terminates at end step 222. Returning to decision step 204, if A is nonnegative, at step 212 A is bit-complemented, at step 214 the sum $\overline{A}+\overline{A}+1$ is calculated, at step 216 the bit-complement of $\overline{A}+\overline{A}+1$ is obtained, and decision step 218 tests whether A is zero. If A is zero, then the bit-complement of $\overline{A}+\overline{A}+1$ provides the result and the algorithm terminates at end step 222. If A is nonzero (and therefore greater than zero since A is also nonnegative), then at step 220 the bit-complement of $\overline{A}+\overline{A}+1$ is incremented to provide the result and the algorithm terminates at end step 222.

Variations to algorithm 200 are apparent. For instance, A can be bit-complemented before the sign bit (or complemented sign bit) of A is inspected. For each value of A, the expressions $\overline{A}+\overline{A}+2+ee$ , $\overline{A}+\overline{A}+1+ee$ , and $\overline{A}+\overline{A}+1+ee$ +1 can be calculated (concurrently if desired) with the appropriate expression selected depending on whether A is less than, equal to, or greater than zero, respectively. Likewise, A can be tested for being less than, equal to, or greater than zero before the appropriate expression is calculated.

Zero detect of A can be accomplished by bit-complementing A, and inspecting a carry-out bit from the MSB position generated by incrementing the bit-complement of A. The carry-out bit is a one only if the bit-complement of A is a string of one's, otherwise the carry-out bit is a zero. Furthermore, the bit-complement of A is a string of one's only if A is a string of zero's. Therefore, the carry-out bit generated by incrementing the bit-complement of A is a one only if A is zero. In a similar manner, zero detect of A can be accomplished by decrementing A, and inspecting a carry-out bit generated by incrementing A−1.

Zero detect of A can also be accomplished by generating a first carry-out bit from the MSB position of the sum $\overline{A}+\overline{A}+1$, generating a second carry-out bit from the MSB position of the sum $\overline{A}+\overline{A}+2$, and determining whether the first and second carry-out bits have different logical values. When A is zero, the first sum is a string of one's, the second sum is a string of zero's, and the first and second carry-out bits will have different logical values. Likewise, when A is nonzero, the first and second carry-out bits will have identical logical values. Advantageously, the first and second carry-out bits can be generated concurrently to provide rapid zero detect. Furthermore, the first and second carry-out bits can be generated without (or before) actually summing the numbers, for instance by use of PG generator sections and carry chains.

Zero detect of A by comparing the first and second carry-out bits is perhaps best understood by considering some of the underlying mathematics. Suppose A is an n-bit operand. If A is equal to zero, the sum A+A is an n-bit string of zero's. As a result, the bit-complement of A+A, or $\overline{A+A}$, is an n-bit string of one's, and incrementing $\overline{A+A}$ provides an n-bit string of zero's with a carry-out bit of one. Thus, zero detect for A can be provided by adding A+A, bit-complementing A+A to obtain $\overline{A+A}$, incrementing $\overline{A+A}$, and inspecting the carry-out bit. In algorithm 200, however, A+A is not calculated. Consider the following algebraic manipulations:

$$\overline{A+A} = -(A+A)-1 \qquad (24)$$

$$\overline{A+A} = -A+-A-1 \qquad (25)$$

$$\overline{A+A} = (\overline{A}+1)+(\overline{A}+1)-1 \qquad (26)$$

$$\overline{A+A} = \overline{A}+\overline{A}+1 \qquad (27)$$

Likewise, $$\overline{A+A}+1 = -(A+A)-1+1 \qquad (28)$$

$$\overline{A+A}+1 = -A+-A-1+1 \qquad (29)$$

$$\overline{A+A}+1 = (\overline{A}+1)+(\overline{A}+1) \qquad (30)$$

$$\overline{A+A}+1 = \overline{A}+\overline{A}+2 \qquad (31)$$

If A is an n-bit string of zero's, $\overline{A}+\overline{A}+1$ is an n-bit string of one's that generates a first carry-out bit of one from the MSB position, and $\overline{A}+\overline{A}+2$ is an n-bit string of zero's that generates a second carry-out bit of zero from the MSB position (and another carry-out bit of one from the MSB+1 position, which is discarded). Accordingly, the first and second carry-out bits have different logical values since A is zero.

Remarkably, the sums $\overline{A}+\overline{A}+1$ and $\overline{A}+\overline{A}+2$ can be used for both calculating 2A+sign(A) and determining whether A is zero.

Further details regarding zero detect are set forth in U.S. application Ser. No. 08/658,454, filed Jun. 5, 1996, entitled "Zero Detect For Binary Sum" by R. Wong, which is incorporated herein by reference.

With regards to overflow, if A is an n-bit number, and 2A+sign(A) is an n-bit or n+1 bit result, then overflow may occur. For instance, if the MSB (or sign bit) of A and the MSB (or sign bit) of the result have different logical values, then overflow occurs. Furthermore, the maximum negative integer value of A will cause overflow even though the MSB's of A and the result are both one's. Therefore, a separate test is needed to indicate overflow due to the maximum negative integer value of A. As one approach, each bit of A can be inspected to determine whether A has this value. However, a more efficient approach is to determine whether the MSB and MSB−1 positions of A have different logical values, since this is the case for the maximum negative integer value as well as other values that cause overflow. Therefore, overflow can be detected by ORing (1) the EXCLUSIVE-OR of the MSB of A and the MSB of the result, and (2) the EXCLUSIVE-OR of the MSB and MSB−1 of A. Furthermore, when overflow occurs, it may be desirable to clamp the result to the maximum integer value with the same sign as A.

Alternatively, if A is an n-bit number and 2A+sign(A) is at least an n+2 bit result, then overflow does not occur. An n+2 bit result is necessary to accommodate the maximum negative integer value of A.

Suppose, for instance, A is a 4-bit operand. The maximum negative integer value of A is binary 1000 (−8). Plugging 1000 into 2A+sign(A) yields 101111(2×(−8)+(−1)=−17), which is a 6-bit number. Thus, the result requires two more bits than A. Furthermore, the 4-bit result 1111 has the same MSB as A. Finally, for those values of A where the MSB and MSB−1 positions have different logical values, namely 0100, 0101, 0110, 0111, 1000, 1001, 1010 and 1011, a 4-bit result always overflows.

Various examples of calculating 2A+sign(A), in accordance with algorithm 200, where A is less than zero, with the possibility of overflow, are listed below in Table 1. Overflow occurs when the sign bit of A has a different logical value than the sign bit of the result, and also when the MSB and MSB−1 of A have different logical values. For illustration purposes, A is a 4-bit operand, and 2A+sign(A) is a 4-bit result.

TABLE 1

CALCULATING 2A + SIGN(A) WHERE A IS LESS THAN ZERO
WITH POSSIBILITY OF OVERFLOW

| Operand | $\overline{A}$ | $\overline{A} + \overline{A} + 2$ | $\overline{A} + \overline{A} + 2$ |
|---|---|---|---|
| A (decimal) | | | [2A + sign(A)] |
| 1000 | 1000 | 0111 | 0000 |
| (decimal −8) | ↓ | 0111 | ↓ |
| | 0111 | + 1110 | 1111 |
| | | 1 0000 | (overflow) |
| 1010 | 1010 | 0101 | 1100 |
| (decimal −6) | ↓ | 0101 | ↓ |
| | 0101 | + 0010 | 0011 |
| | | 0 1100 | (overflow) |
| 1101 | 1101 | 0010 | 0110 |
| (decimal −3) | ↓ | 0010 | ↓ |

TABLE 1-continued

CALCULATING 2A + SIGN(A) WHERE A IS LESS THAN ZERO
WITH POSSIBILITY OF OVERFLOW

|   |   | 0010 | + 0010 | 1001 |
|---|---|---|---|---|
|   |   |   | 0 0110 | (decimal −7) |
| 1111 | 1111 | 0000 | 0010 |   |
| (decimal −1) | ↓ | 0000 | ↓ |   |
|   | 0000 | + 0010 | 1101 |   |
|   |   | 0 0010 | (decimal −3) |   |

Various examples of calculating 2A+sign(A), in accordance with algorithm 200, where A is less than zero, without the possibility of overflow, are listed below in Table 2. For illustrated purposes, A is a 4-bit operand, and 2A+sign(A) is a 6-bit result.

TABLE 2

CALCULATING 2A + SIGN(A) WHERE A IS LESS THAN ZERO
WITHOUT POSSIBILITY OF OVERFLOW

| Operand | A sign | $\bar{A}$ | $\bar{A} + \bar{A} + 2$ | $\overline{\bar{A} + \bar{A}} + 2$ |
|---|---|---|---|---|
| A (decimal) | extended |   |   | [2A + sign(A)] |
| 1000 | 111000 | 111000 | 000111 | 010000 |
| (decimal −8) |   | ↓ | 000111 | ↓ |
|   |   | 000111 | + 000010 | 101111 |
|   |   |   | 0 010000 | (decimal −17) |
| 1010 | 111010 | 111010 | 000101 | 001100 |
| (decimal −6) |   | ↓ | 000101 | ↓ |
|   |   | 000101 | + 000010 | 110011 |
|   |   |   | 0 001100 | (decimal −13) |
| 1101 | 111101 | 111101 | 000010 | 000110 |
| (decimal −3) |   | ↓ | 000010 | ↓ |
|   |   | 000010 | + 000010 | 111001 |
|   |   |   | 0 000110 | (decimal −7) |
| 1111 | 111111 | 111111 | 000000 | 000010 |
| (decimal −1) |   | ↓ | 000000 | ↓ |
|   |   | 000000 | + 000010 | 111101 |
|   |   |   | 0 000010 | (decimal −3) |

A single example of calculating 2A+sign(A), in accordance with algorithm 200, where A is equal to zero, is listed below in Table 3. For illustration purposes, A is a 4-bit operand, and 2A+sign(A) is a 4-bit result.

TABLE 3

CALCULATING 2A + SIGN(A) WHERE A IS EQUAL TO ZERO

| Operand | $\bar{A}$ | $\bar{A} + \bar{A} + 1$ | $\overline{\bar{A} + \bar{A}} + 1$ |
|---|---|---|---|
| A (decimal) |   |   | [2A + sign(A)] |
| 0000 | 0000 | 1111 | 1111 |
| (decimal 0) | ↓ | 1111 | ↓ |
|   | 1111 | + 0001 | 0000 |
|   |   | 1 1111 | (decimal 0) |

Various examples of calculating 2A+sign(A) in accordance with algorithm 200, where A is greater than zero, with the possibility of overflow, are listed below in Table 4. Overflow occurs when the sign of bit of A has a different logical value than the sign bit of the result. For illustration purposes, A is a 4-bit operand, and 2A+sign(A) is a 4-bit result.

TABLE 4

CALCULATING 2A + SIGN(A) WHERE A IS GREATER THAN ZERO
WITH POSSIBILITY OF OVERFLOW

| Operand | $\bar{A}$ | $\bar{A} + \bar{A} + 1$ | $\overline{\bar{A} + \bar{A}} + 1$ | $\overline{\bar{A} + \bar{A} + 1} + 1$ |
|---|---|---|---|---|
| A (decimal) |   |   |   | [2A + sign(A)] |
| 0111 | 0111 | 1000 | 0001 | 1110 |
| (decimal 7) | ↓ | 1000 | ↓ | + 0001 |
|   | 1000 | + 0001 | 1110 | 0 1111 |
|   |   | 1 0001 |   | (overflow) |
| 0110 | 0110 | 1001 | 0011 | 1100 |
| (decimal 6) | ↓ | 1001 | ↓ | + 0001 |
|   | 1001 | + 0001 | 1100 | 0 1101 |
|   |   | 1 0011 |   | (overflow) |
| 0011 | 0011 | 1100 | 1001 | 0110 |
| (decimal 3) | ↓ | 1100 | ↓ | + 0001 |
|   | 1100 | + 0001 | 0110 | 0 0111 |
|   |   | 1 1001 |   | (decimal 7) |
| 0001 | 0001 | 1110 | 1101 | 0010 |
| (decimal 1) | ↓ | 1110 | ↓ | + 0001 |
|   | 1110 | + 0001 | 0010 | 0 0011 |
|   |   | 1 1101 |   | (decimal 3) |

Various examples of calculating 2A+sign(A), in accordance with algorithm 200, where A is greater than zero, without the possibility of overflow, are listed below in Table 5. For illustration purposes, A is a 4-bit operand, and 2A+sign(A) is a 6-bit result.

TABLE 5

CALCULATING 2A + SIGN(A) WHERE A IS GREATER THAN ZERO
WITHOUT POSSIBILITY OF OVERFLOW

| Operand | A sign | $\overline{A}$ | $\overline{A} + \overline{A} + 1$ | $\overline{\overline{A} + \overline{A} + 1}$ | $\overline{\overline{A} + \overline{A} + 1} + 1$ |
|---|---|---|---|---|---|
| A (decimal) | extended | | | | [2A + sign(A)] |
| 0111 (decimal 7) | 000111 | 000111 ↓ | 111000 111000 | 110001 ↓ | 001110 + 000001 |
| | | 111000 | + 000001 | 001110 | 0 001111 |
| | | | 1 110001 | | (decimal 15) |
| 0110 (decimal 6) | 000110 | 000110 ↓ | 111001 111001 | 110011 ↓ | 001100 + 000001 |
| | | 111001 | + 000001 | 001100 | 0 001101 |
| | | | 1 110011 | | (decimal 13) |
| 0011 (decimal 3) | 000011 | 000011 ↓ | 111100 111100 | 111001 ↓ | 000110 + 000001 |
| | | 111100 | + 000001 | 001100 | 0 000111 |
| | | | 1 111001 | | (decimal 7) |
| 0001 (decimal 1) | 000001 | 000001 ↓ | 111110 111110 | 111101 ↓ | 000010 + 000001 |
| | | 111110 | + 000001 | 000010 | 0 000011 |
| | | | 1 111101 | | (decimal 3) |

Figure 3:
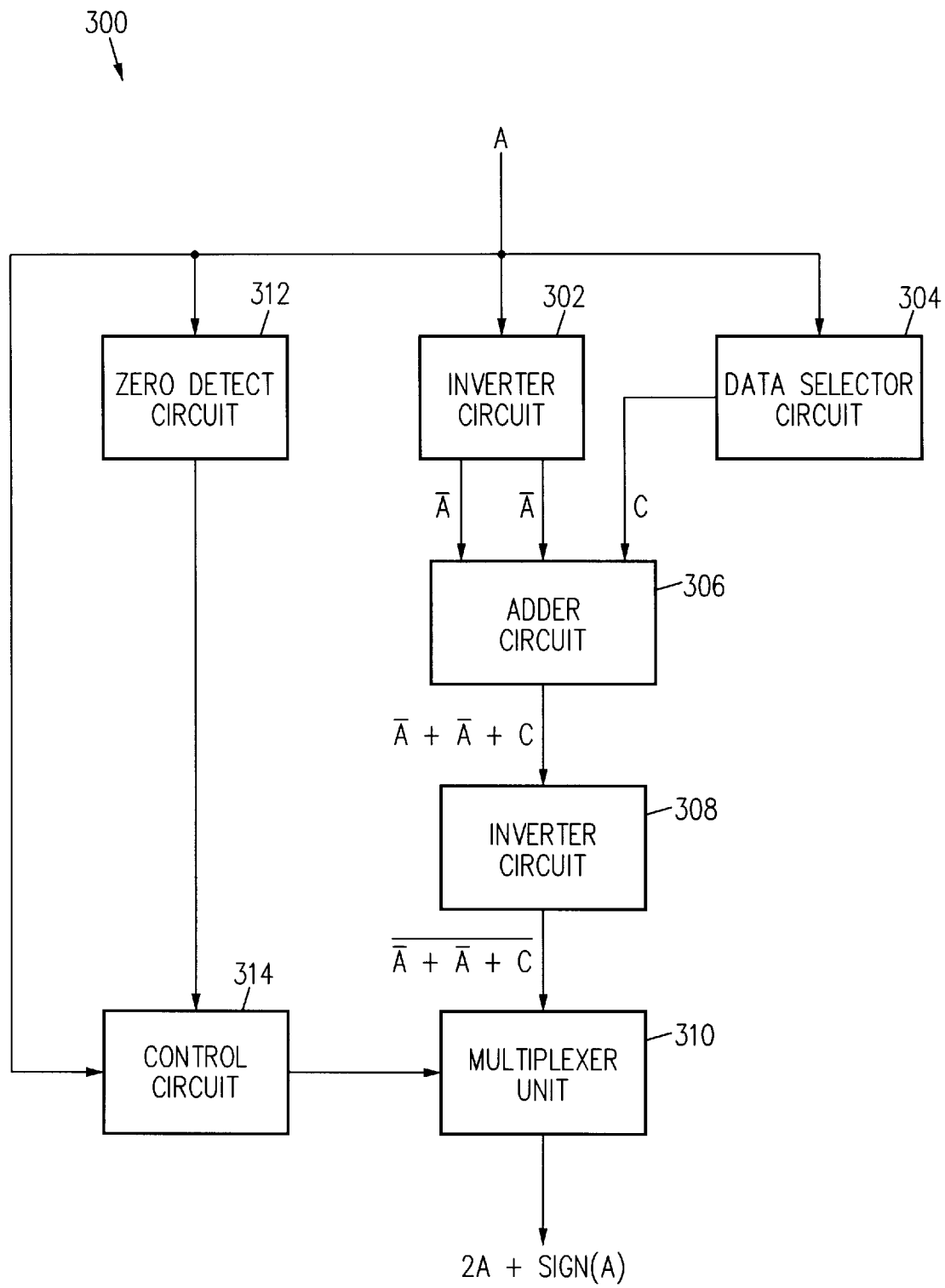
FIG. 3 is a block diagram of a logic circuit for calculating 2A+sign(A) in accordance with an embodiment of the present invention.

FIG. 3 is a block diagram of a logic circuit 300 for calculating 2A+sign(A) in accordance with an embodiment of the present invention. Inverter circuit 302 includes an operand input coupled to A and generates $\overline{A}$ at first and second outputs. Data selector circuit 304 includes an input coupled to the sign bit of A, and generates a constant C at its output set to one when A is greater than or equal to zero, and set to two when A is less than zero. Adder circuit 306 includes first and second operand inputs for receiving $\overline{A}$ and a third operand input for receiving the constant C. Adder circuit 306 generates the sum $\overline{A}+\overline{A}+C$ at a sum output. Thus, adder circuit 306 generates $\overline{A}+\overline{A}+2$ when A is less than zero, and $\overline{A}+\overline{A}+b$ 1 when A is greater than or equal to zero. Inverter circuit 308 includes an operand input coupled to the sum output and generates the bit-complement of the sum output, or $\overline{\overline{A}+\overline{A}+C+ee}$. Multiplexer unit 310 receives $\overline{\overline{A}+\overline{A}+C+ee}$, and outputs either $\overline{\overline{A}+\overline{A}+C+ee}$ or $\overline{\overline{A}+\overline{A}+C+ee} +1$ in response to a control input. In effect, multiplexer unit 310 automatically outputs all bits except the LSB of $\overline{\overline{A}+\overline{A}+C+ee}$, and selects between the LSB of $\overline{A}+\overline{A}+C$ and the LSB of $\overline{\overline{A}+\overline{A}+C+ee}$ to provide the LSB of the output. Zero detect circuit 312 determines whether A is zero or nonzero, and control circuit 314 controls multiplexer unit 310 in response to zero detect circuit 312 and the sign bit of A. Control circuit 314 causes multiplexer unit 310 to output $\overline{\overline{A}+\overline{A}+C+ee}$ when the sign bit of A indicates A is negative or zero detect circuit 312 indicates A is zero, and otherwise causes multiplexer unit 310 to output $\overline{\overline{A}+\overline{A}+C+ee} +1$ when the sign bit of A indicates A is nonnegative and zero detect circuit 312 indicates A is nonzero (thereby indicating A is greater than zero). In this manner, multiplexer unit 310 outputs $\overline{\overline{A}+\overline{A}+2+ee}$ when A is less than zero, $\overline{\overline{A}+\overline{A}+1+ee}$ when A is equal to zero, and $\overline{\overline{A}+\overline{A}+1+ee} +1$ when A is greater than zero.

Alternatively, if desired, the sum $\overline{A}+\overline{A}+C$ can be provided by arithmetically left-shifting $\overline{A}$ by one bit position, and applying the left-shifted $\overline{A}$ (or $2\overline{A}$) and C to first and second operand inputs of adder circuit 306. Also, numerous techniques can be used to set the LSB of the result to one (thereby bit-complementing all bits except the LSB of $\overline{A}+$ $\overline{A}+1$) when A is greater than zero. Moreover, zero detect circuit 312 can be modified to inspect carry-out bits from MSB positions of sum and sum-plus-one outputs of adder circuit 306, instead of inspecting A directly.

Figure 4:
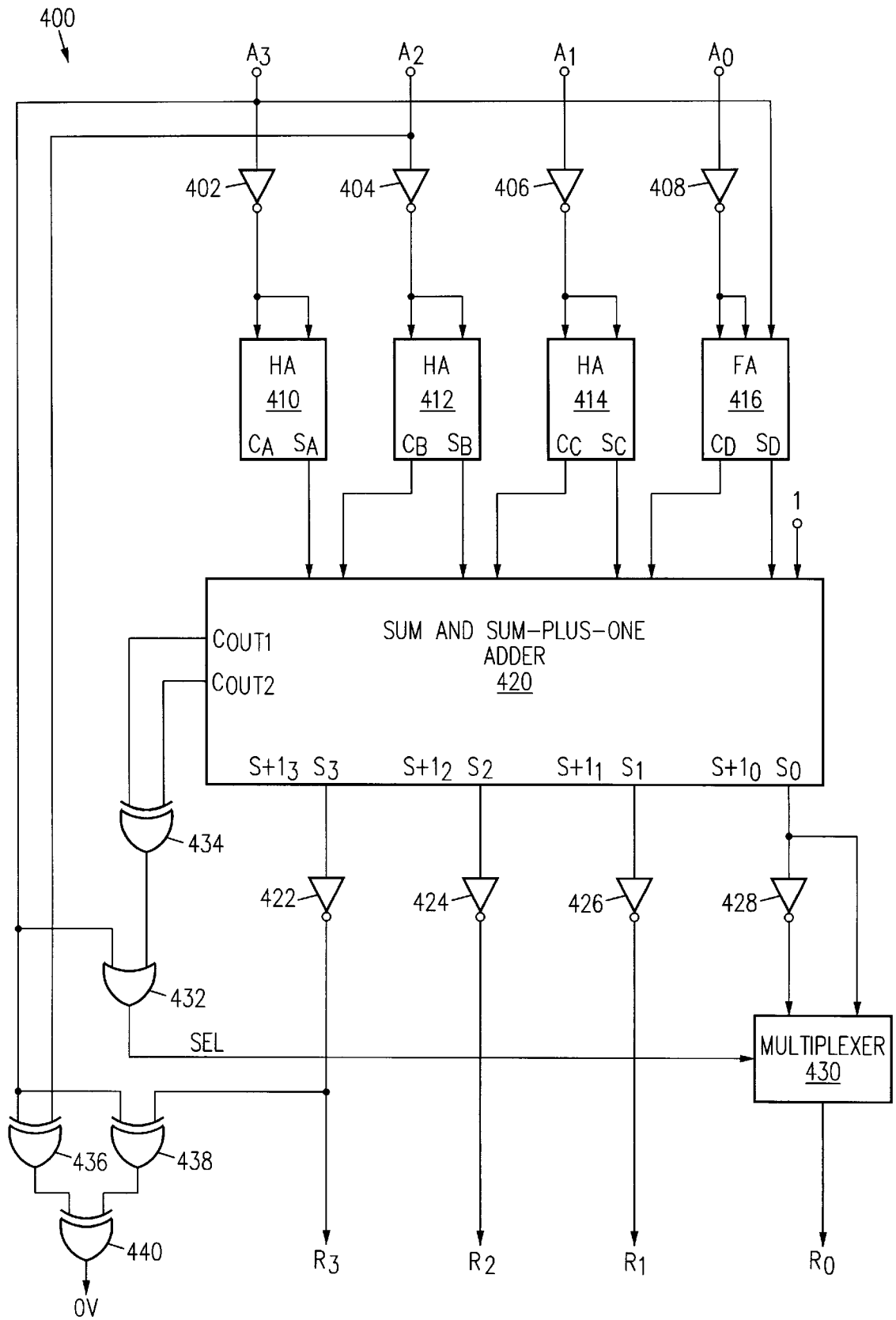
FIG. 4 is a block diagram of a logic circuit for calculating 2A+sign(A) in accordance with another embodiment of the present invention.

FIG. 4 is a block diagram of a logic circuit 400 for calculating 2A+sign(A) in accordance with another embodiment of the invention. Logic circuit 400 receives a four-bit operand A, consisting of bits $A_3$, $A_2$, $A_1$ and $A_0$, and calculates a four-bit result, consisting of bits $R_3$, $R_2$, $R_1$ and $R_0$. Bits $A_3$ and $R_3$ are the MSBs. Logic circuit 400 also generates overflow signal OV. Bit $A_3$ is applied to inverter 402, bit $A_2$ is applied to inverter 404, bit $A_1$ is applied to inverter 406, and bit $A_0$ is applied to inverter 408. Inverters 402, 404, 406 and 408 generate bits $\overline{A_3}$, $\overline{A_2}$, $\overline{A_1}$ and $\overline{A_0}$, respectively. Bit $\overline{A_3}$ is applied to first and second operand inputs of half adder 410, bit $\overline{A_2}$ is applied to first and second operand inputs of half adder 412, bit $\overline{A_1}$ is applied to first and second operand inputs of half adder 414, and bit $\overline{A_0}$ is applied to first and second operand inputs of full adder 416. Furthermore, bit $A_3$ is applied to a third operand input of full adder 416.

The outputs of half adders 410, 412 and 414 and full adder 416 are applied to operand inputs of sum and sum-plus-one adder 420. In particular, sum bit $S_A$ of half adder 410 and carry-out bit $C_B$ of half adder 412 are applied to stage 3 of adder 420, sum bit $S_B$ of half adder 412 and carry-out bit $C_C$ of half adder 414 are applied to stage 2 of adder 420, sum bit $S_C$ of half adder 414 and carry-out bit $C_D$ of full adder 416 are applied to stage 1 of adder 420, and sum bit $S_D$ of full adder 416 is applied to stage 0 of adder 420. Furthermore, a one is applied to stage 0 of adder 420 and, as mentioned above, bit $A_3$ is applied to full adder 416, thereby providing a constant C of two when A is negative, and providing a constant C of one when A is positive. Adder 420 generates a sum output, consisting of bits $S_3$, $S_2$, $S_1$ and $S_0$, and a sum-plus-one output, consisting of bits $S+1_3$, $S+1_2$, $S+1_1$ and $S+1_0$. Adder 420 also generates first carry-out bit $C_{OUT1}$ from stage 3 of the sum output, and second carry-out bit $C_{OUT2}$ from stage 3 of the sum-plus-one output. In fact, the sum-plus-one output need not be generated as long as second carry-out bit $C_{OUT2}$ is generated.

Bit $S_3$ is applied to inverter 422, bit $S_2$ is applied to inverter 424, bit $S_1$ is applied to inverter 426, and bit $S_0$ is applied to inverter 428. Inverters 422, 424, 426 and 428 generate bits $\overline{S_3}$, $\overline{S_2}$, $\overline{S_1}$ and $\overline{S_0}$, respectively. Bits $\overline{S_3}$, $\overline{S_2}$ and $\overline{S_1}$ provide bits $R_3$, $R_2$ and $R_1$, respectively. Furthermore, bits $\overline{S_0}$ and $S_0$ are applied to first and second operand inputs of 2:1 multiplexer 430, and select signal SEL is applied to a control input of multiplexer 430. Multiplexer 430 selects the first input thereof and outputs bit $\overline{S_0}$ to provide bit $R_0$ when signal SEL is a one, and multiplexer 430 selects the second input thereof and outputs bit $S_0$ to provide bit $R_0$ when signal SEL is a zero. OR gate 432 generates signal SEL as a one when bit $A_3$ is a one, indicating A is negative. OR gate 432 also generates signal SEL as a one when bit $A_3$ is a zero and EXCLUSIVE-OR gate 434 generates a one, indicating A is zero, when first carry-out bit $C_{OUT1}$ from $\overline{A}+\overline{A}+1$ and second carry-out bit $C_{OUT2}$ from $\overline{A}+\overline{A}+2$ have different logical values. Finally, OR gate 432 generates signal SEL as a zero only when bit $A_3$ is a zero and EXCLUSIVE-OR gate 434 generates a zero, indicating A is greater than zero.

Overflow detection is provided by EXCLUSIVE-OR gates 436 and 438 coupled to OR gate 440. EXCLUSIVE-OR gate 436 indicates when bits $A_3$ and $A_2$ have different logical values, and EXCLUSIVE-OR gate 438 indicates when bits $A_3$ and $R_3$ have different logical values. Accordingly, OR gate 440 receives the outputs of EXCLUSIVE-OR gates 436 and 438, and generates overflow signal OV at its output.

Thus, when A is less than zero, bit $A_3$ is a one, adder 420 generates $\overline{A}+\overline{A}+2$ at the sum output, inverters 422 to 428 generate $\overline{A}+\overline{A}+2+ee$, signal SEL is a one, multiplexer 430 selects bit $\overline{S_0}$, and the result is $\overline{A}+\overline{A}+2+ee$. When A is equal to zero, bit $A_3$ is a zero, adder 420 generates $\overline{A}+\overline{A}+1$ at the sum output, inverters 422 to 428 generate $\overline{A}+\overline{A}+1+ee$, signal SEL is a one, multiplexer 430 selects bit $\overline{S_0}$, and the result is $\overline{A}+\overline{A}+1+ee$. When A is greater than zero, bit $A_3$ is a zero, adder 420 generates $\overline{A}+\overline{A}+1$ at the sum output, inverters 422 to 428 generate $\overline{A}+\overline{A}+1+ee$, signal SEL is a zero, multiplexer 430 selects bit $S_0$, and the result is $\overline{A}+\overline{A}+1+ee+1$.

Figure 5:
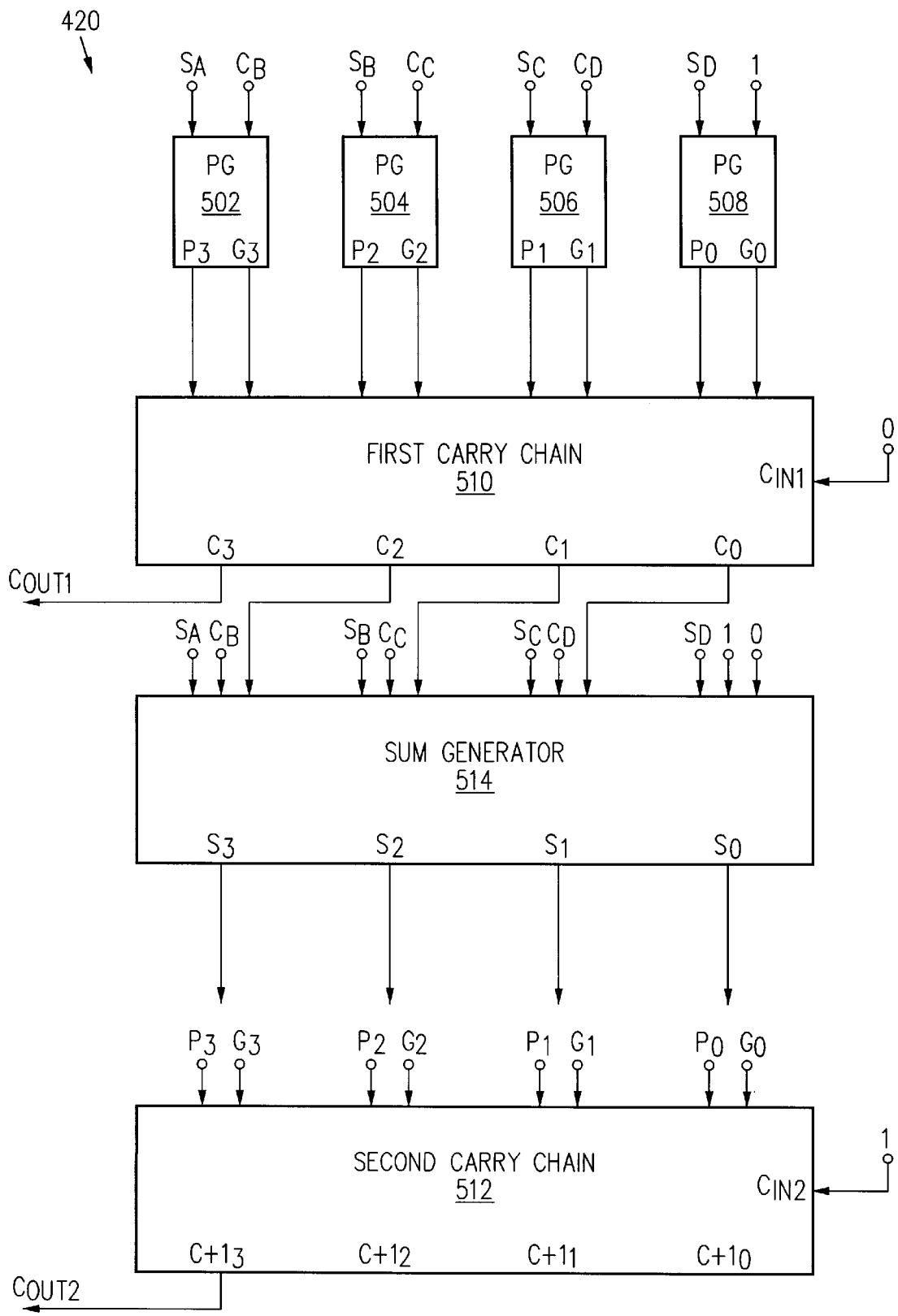
FIG. 5 is a block diagram of a sum and sum-plus-one adder suitable for use in the logic circuit of FIG. 4.

FIG. 5 shows an implementation for adder 420. In this implementation, the sum output is provided by a carry lookahead adder that performs fast addition within the basic step time of an instruction cycle. Propagate-generate (PG) sections 502, 504, 506 and 508 receive bits $S_A$ and $C_B$, $S_B$ and $C_C$, $S_C$ and $C_D$, and $S_D$ and a one, respectively, and provide propagate and generate signals $P_3$ and $G_3$, $P_2$ and $G_2$, $P_1$ and $G_1$, and $P_0$ and $G_0$, respectively. The propagate and generate signals are furnished to respective stages of first carry chain 510 and second carry chain 512. First carry chain 510 receives a zero as its least significant carry-in bit $C_{IN1}$, and generates carry-out bits $C_3$, $C_2$, $C_1$ and $C_0$. Second carry chain 512 receives a one as its least significant carry-in bit $C_{IN2}$, and generates carry-out bits $C+1_3$, $C+1_2$, $C+1_1$ and $C+1_0$. Carry-out bit $C_3$ provides first carry-out bit $C_{OUT1}$, and carry-out bit $C+1_3$ provides second carry-out bit $C_{OUT2}$. Advantageously, first and second carry-out bits $C_{OUT1}$ and $C_{OUT2}$ are generated concurrently. Furthermore, sum generator 514 receives bits $S_A$, $C_B$ and $C_2$ at stage 3, bits $S_B$, $C_C$, and $C_1$ at stage 2, bits $S_C$, $C_D$ and $C_0$ at stage 1, and bit $S_D$ and a one and a zero at stage 0. As a result, sum generator 514 generates sum bits $S_3$, $S_2$, $S_1$ and $S_0$. Each stage of sum generator 514 may include, for instance, first and second two-input EXCLUSIVE-OR gates (not shown), with the inputs of the first EXCLUSIVE-OR gate and the second input of the second EXCLUSIVE-OR gate receiving the bits to be summed, the output of the first EXCLUSIVE-OR gate coupled to the first input of the second EXCLUSIVE-OR gate, and the output of the second EXCLUSIVE-OR gate providing the sum bit. Also, if the sum-plus-one output is desired, another sum generator can be utilized in a similar manner. Suitable PG sections, carry chains and sum generators are well-known in the art.

The description of the invention set forth herein is illustrative, and is not intended to limit the scope of the invention as set forth in the following claims. A general purpose computer or processor can execute the invention in a single instruction cycle (as is preferred) or multiple instruction cycles. The invention is well-suited for many data processing applications. Variations and modifications of the embodiments disclosed herein may be made based on the description set forth herein, without departing from the scope and spirit of the invention as set forth in the following claims.

What is claimed is:

1. An apparatus for calculating 2A+sign(A), where A is a signed binary integer represented in 2's complement form, sign(A) is equal to one when A is greater than zero, sign(A) is equal to zero when A is zero, and sign(A) is equal to negative one when A is less than zero, comprising:

a first inverter circuit for bit-complementing A to obtain $\overline{A}$;

a data selector circuit for setting a constant C to two when A is less than zero and setting the constant C to one when A is greater than or equal to zero;

an adder circuit for calculating $(\overline{A}+\overline{A}+2)$ at a sum output when A is less than zero, and for calculating $(\overline{A}+\overline{A}+1)$ at the sum output when A is greater than or equal to zero;

a second inverter circuit for bit-complementing the sum output; and a multiplexer for selecting between a least significant bit of an output of the second inverter circuit and a least significant bit of the sum output, wherein an output of the second inverter circuit with the least significant bit thereof replaced by an output of the multiplexer provides 2A+sign(A).

2. The apparatus of claim 1, wherein the adder circuit includes first and second operand inputs coupled to $\overline{A}$ and a third operand input coupled to the constant C.

3. The apparatus of claim 1, including:

a zero detect circuit for determining whether A is zero or nonzero; and a control circuit for controlling the multiplexer in response to a sign bit of A and the zero detect circuit.

4. The apparatus of claim 1, including an overflow detection circuit for indicating overflow when a sign bit of A and a sign bit of the output of the second inverter circuit have different logical values, and when the sign bit of A and a second-most significant bit of A have different logical values.

5. An apparatus for calculating 2A+sign(A), where A is a signed binary integer represented in 2's complement form, sign(A) is equal to one when A is greater than zero, sign(A) is equal to zero when A is zero, and sign(A) is equal to negative one when A is less than zero, comprising:

a first inverter circuit having an operand input coupled to A and having an output for providing a bit-complement of A;

a data selector circuit coupled to a sign bit of A and having an output for setting a constant C to one when A is greater than or equal to zero and for setting the constant C to two when A is less than zero;

an adder circuit having first and second operand inputs coupled to the output of the first inverter circuit, having a third operand input coupled to the output of the data selector circuit, and having a sum output representing a sum of the first, second and third operands;

a second inverter circuit having an operand input coupled to the sum output and having an output for providing a bit-complement of the sum output;

a zero detect circuit for determining whether A is zero or nonzero;

a multiplexer having a first input coupled to a least significant bit of the output of the second inverter circuit, having a second input coupled to a least significant bit of the sum output, and having a select input; and a control circuit, responsive to the sign bit of A and the zero detect circuit, having a control output coupled to the select input of the multiplexer, which causes the multiplexer to select the first input thereof when A is less than or equal to zero, and causes the multiplexer to select the second input thereof when A is greater than zero;

wherein the output of the second inverter circuit with the least significant bit thereof replaced by an output of the multiplexer provides 2A+sign(A).

6. The apparatus of claim 5, wherein:

the control circuit causes the multiplexer to select the first input thereof when the sign bit of A is a one;

the control circuit causes the multiplexer to select the first input thereof when the zero detect circuit indicates A is zero; and the control circuit causes the multiplexer to select the second input thereof when the sign bit of A is a zero and the zero detect circuit indicates A is nonzero.

7. The apparatus of claim 5, wherein the data selector circuit couples the sign bit of A and a one to a least significant stage of the adder circuit, thereby setting the constant C to one when A is greater than or equal to zero, and setting the constant C to two when A is less than zero.

8. The apparatus of claim 5, wherein the adder circuit includes a sum-plus-one output, representing a sum of the operands plus one, and the zero detect circuit determines whether a first carry-out bit from the sum output and a second carry-out bit from the sum-plus-one output have different logical values.

9. The apparatus of claim 8, wherein the first and second carry-out bits are generated concurrently.

10. The apparatus of claim 5, wherein the adder circuit includes a row of carry save adders that provide the first and second operand inputs, a sum adder coupled to the carry save adders for providing the sum output, and a sum-plus-one adder coupled to the carry save adders for providing a sum-plus-one output.

11. The apparatus of claim 10, wherein:

the sum adder includes propagate-generate sections coupled to a first carry chain coupled to a first sum generator that provides the sum output, with the first carry chain having a carry-in bit set to zero; and the sum-plus-one adder includes the propagate-generate sections coupled to a second carry chain coupled to a second sum generator that provides the sum-plus-one output, with the second carry chain having a carry-in bit set to one.

* * * * *